(12) United States Patent
Checketts et al.

(10) Patent No.: US 7,029,180 B2
(45) Date of Patent: Apr. 18, 2006

(54) FLANGED BUSHES AND METHODS FOR THE MANUFACTURE THEREOF

(75) Inventors: Jonathan Checketts, Fontenay-Aux-Roses (FR); Bernard Fumex, Pringy (FR); Marcel Verney, Gruffy (FR)

(73) Assignee: Glacier Garlock Bearing, Inc., Thorofare, NJ (US)

( * ) Notice: Subject to any disclaimer, the term of this patent is extended or adjusted under 35 U.S.C. 154(b) by 194 days.

(21) Appl. No.: 10/468,023

(22) PCT Filed: Feb. 22, 2002

(86) PCT No.: PCT/US02/05696
§ 371 (c)(1),
(2), (4) Date: Feb. 27, 2004

(87) PCT Pub. No.: WO02/070908
PCT Pub. Date: Sep. 12, 2002

(65) Prior Publication Data
US 2004/0136626 A1 Jul. 15, 2004

(30) Foreign Application Priority Data
Feb. 24, 2001 (GB) .................................... 0104656

(51) Int. Cl.
*F16C 17/10* (2006.01)
*F16C 43/02* (2006.01)
*B21D 53/10* (2006.01)

(52) U.S. Cl. .................. 384/275; 384/296; 29/898.059
(58) Field of Classification Search ................ 384/276, 384/275, 294, 295, 296; 29/898.042, 898.054–898.059
See application file for complete search history.

(56) References Cited

U.S. PATENT DOCUMENTS

| 4,239,303 A | 12/1980 | Backlin |
| 4,437,214 A | 3/1984 | Olschewski et al. |
| 4,714,356 A | 12/1987 | Damour et al. |
| 4,917,509 A | 4/1990 | Takano |

FOREIGN PATENT DOCUMENTS

| DD | DT 2406361 | 8/1975 |
| DD | DT 2649619 | 7/1977 |

(Continued)

OTHER PUBLICATIONS

International Search Report mailed May 31, 2002 corresponding to PCT/US02/05696.

*Primary Examiner*—Thomas R. Hannon
(74) *Attorney, Agent, or Firm*—John M. Harrington; Kilpatrick Stockton LLP (57) ABSTRACT

The present invention provides a flanged bush including a substantially cylindrical body portion, a radial flange portion, and an undercut region disposed within a surface of the body portion and the flange portion, wherein the undercut region is operable for relieving stresses present in the surface of the body portion and the flange portion. The present invention also provides a flanged bush including a substantially cylindrical body portion and a pair of substantially semi-circular members, wherein the pair of semi-circular members form a radial flange portion of the flanged bush. The present invention further provides a method for the manufacture of a flanged bush including providing a substantially cylindrical structure, bending an end portion of the structure 45 degrees, and bending the end portion 90 degrees. The method also including bending the end portion of the structure past 90 degrees and allowing the end portion to return to 90 degrees.

28 Claims, 9 Drawing Sheets

FOREIGN PATENT DOCUMENTS

| | | |
|---|---|---|
| DE | 37 36 390 | 5/1989 |
| FR | 2 425 017 | 11/1979 |
| GB | 704 174 | 2/1954 |
| GB | 748 851 | 5/1956 |
| GB | 1 372 768 | 11/1974 |
| GB | 1 539 420 | 1/1979 |
| GB | 2092239 | 2/1982 |
| GB | 2 126 669 | 3/1984 |
| GB | 2154301 | 9/1985 |
| GB | 2 193 268 | 2/1988 |
| GB | 2 241 752 | 9/1991 |
| GB | 2241751 | 9/1991 |
| JP | 11303856 | 11/1999 |
| SU | 831266 | 5/1981 |
| SU | 1636089 | 3/1991 |

FLANGED BUSHES AND METHODS FOR THE MANUFACTURE THEREOF

CROSS-REFERENCE TO RELATED APPLICATION(S)

This patent application claims the benefit of UK Patent Application No. 0104656.4, entitled "FLANGED BUSHES", filed Feb. 24, 2001.

FIELD OF THE INVENTION

The present invention relates generally to flanged bushes and methods for the manufacture thereof. More specifically, the present invention relates to substantially cylindrical flanged bushes having both out-turned and in-turned radial flanges and methods for the manufacture thereof.

BACKGROUND OF THE INVENTION

A flanged bush, also referred to as a "flanged bearing", a "flanged bearing bush", a "cylindrical bearing bush", and a "lining bush", is typically used to support a shaft or other structure and is disposed, for example, in an opening of a housing or other structure. The flanged bush is typically substantially cylindrical, and has an exterior portion that is made of a material that is capable of withstanding predetermined loads, such as steel, and an interior portion that is made of a bearing material, such as a polymer or another metal. The cylindrical body is operable for supporting a predetermined transverse load and the radial flange is operable for supporting a predetermined axial load. Most conventional flanged bushes include an out-turned radial flange, however, an in-turned radial flange may also be utilized, depending upon the desired application.

Depending upon the desired application, it may also be preferable to maximize the dimensions of the radial flange. This is true, for example, in internal combustion engine (ICE) pulley damper applications. For a given axial load, increasing the dimensions of the radial flange increases the surface area of the radial flange in contact with the housing or other structure and decreases the surface pressure exerted on the radial flange material, thereby increasing the life of the flanged bush. Conventional flanged bush designs and the methods for the manufacture thereof typically limit the dimensions and contact surface area of the flanged bush.

Conventional methods for the manufacture of flanged bushes suffer other limitations as well. For example, one conventional method for the manufacture of a flanged bush includes welding a washer onto a rolled bush, forming the radial flange. This method, however, inefficiently utilizes the radial flange material and results in undesirable waste. Likewise, another conventional method for the manufacture of a flanged bush having an in-turned radial flange typically results in the wrinkling of the contact surface of the radial flange.

Thus, what is needed are flanged bushes and methods for the manufacture thereof that incorporate wrinkle-free radial flanges of varying dimensions and contact surface areas, efficiently utilize radial flange material, and result in minimal waste.

BRIEF SUMMARY OF THE INVENTION

Advantageously, embodiments of the present invention provide flanged bushes and methods for the manufacture thereof that incorporate wrinkle-free radial flanges of varying dimensions and contact surface areas, efficiently utilize radial flange material, and result in minimal waste.

In one embodiment of the present invention, a flanged bush includes a substantially cylindrical body portion, a radial flange portion integrally formed with the substantially cylindrical body portion, and an undercut region disposed within a surface of the substantially cylindrical body portion and the radial flange portion, wherein the undercut region is operable for relieving stresses present in the surface of the substantially cylindrical body portion and the radial flange portion.

In another embodiment of the present invention, a method for the manufacture of a flanged bush includes providing a substantially cylindrical body portion, undercutting a region disposed within a surface of the substantially cylindrical body portion, and bending an end portion of the substantially cylindrical body portion to form a radial flange portion, wherein the resulting bend is coincident with the undercut region, thereby relieving stresses present in the surface of the substantially cylindrical body portion and the radial flange portion.

In a further embodiment of the present invention, a flanged bush includes a substantially cylindrical body portion and a pair of substantially semi-circular members fixedly attached to the substantially cylindrical body portion, wherein the pair of substantially semi-circular members form a radial flange portion of the flanged bush.

In a further embodiment of the present invention, a method for the manufacture of a flanged bush includes providing a substantially cylindrical body portion, providing a plurality of substantially semi-circular members, and fixedly attaching the plurality of substantially semi-circular members to the substantially cylindrical body portion, wherein the plurality of substantially semi-circular members form a radial flange portion of the flanged bush.

In a further embodiment of the present invention, a method for the manufacture of a flanged bush includes providing a substantially cylindrical structure, wherein the substantially cylindrical structure comprises an end portion, bending the end portion of the substantially cylindrical structure about 45 degrees, and bending the end portion of the substantially cylindrical structure about 90 degrees, wherein the bent end portion of the substantially cylindrical structure forms a radial flange portion of the flanged bush. Optionally, the method also includes bending the end portion of the substantially cylindrical structure past about 90 degrees and allowing the end portion of the substantially cylindrical structure to return to about 90 degrees, wherein the bent end portion of the substantially cylindrical structure forms a radial flange portion of the flanged bush.

In a further embodiment of the present invention, a method for the manufacture of a flanged bush includes providing a flat strip of bearing material, bending an edge of the flat strip of bearing material about 90 degrees, and rolling the flat strip of bearing material into a substantially cylindrical structure such that the bent edge forms a radial flange portion. Optionally, the method also includes incorporating a groove into a surface of the flat strip of bearing material, the groove coincident with a bending region of the edge of the flat strip of bearing material, cutting a plurality of segmented portions into the edge of the flat strip of bearing material, and welding edges of adjacent segmented portions.

DETAILED DESCRIPTION OF THE INVENTION

Figure 1:
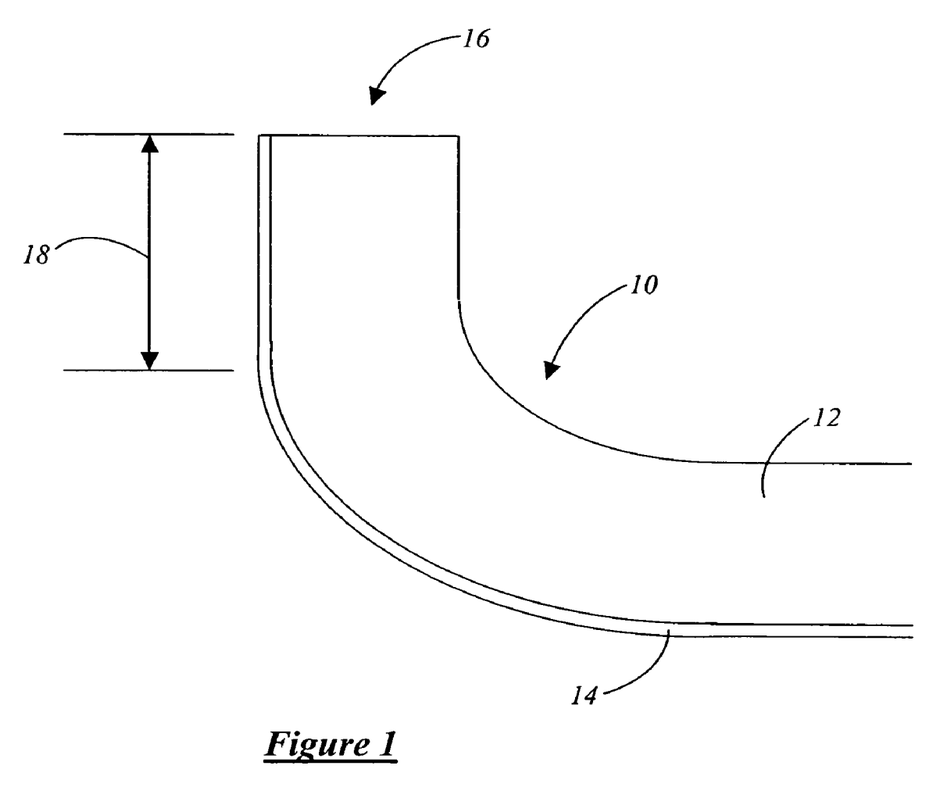
FIG. 1 is a cross-sectional side view of a conventional flanged bush that includes either an out-turned or an in-turned radial flange.

Referring to FIG. 1, a conventional flanged bush 10 includes a backing 12 and an overlay or lining 14. The backing 12 may be made of, for example, steel, brass, or bronze, and the overlay 14 may be made of, for example, a polymer, aluminum, or another metal. The polymer may be infiltrated into a porous metal matrix, the porous metal matrix being carried on a steel backing 12. The porous metal matrix may be sintered to or sprayed on the steel backing 12. The backing 12 and the overlay 14 form a substantially cylindrical structure having an exterior portion and an interior portion. The flanged bush 10 is used to support a shaft or other structure (not shown) and is disposed, for example, in an opening of a housing or other structure (not shown). The flanged bush 10 also includes a substantially disc-shaped radial flange 16 that extends either radially-outward or radially-inward from the substantially cylindrical structure. The exterior portion of the substantially cylindrical structure is capable of withstanding predetermined loads. Specifically, the substantially cylindrical structure is operable for supporting a predetermined transverse load and the radial flange 16 is operable for supporting a predetermined axial load. The radial flange 16 includes a first contact surface area 18 (which may be positioned on either side of the radial flange 16) that contacts the housing or other structure.

Figure 2:
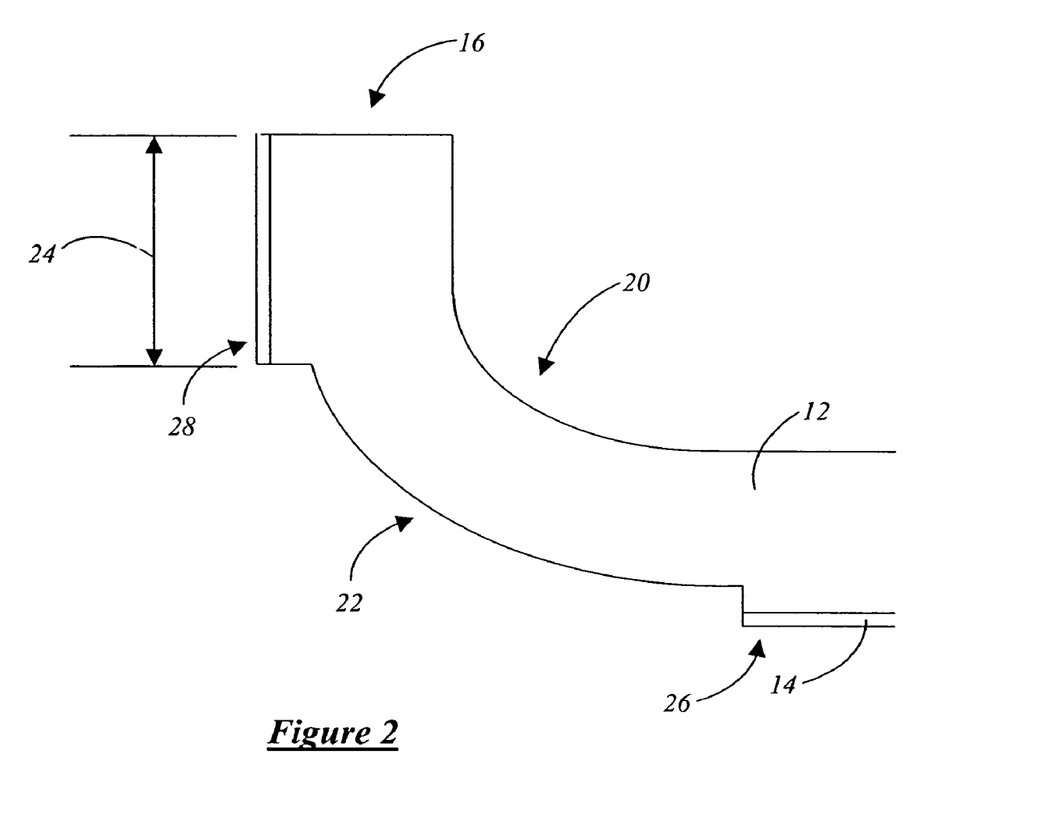
FIG. 2 is a cross-sectional side view of one embodiment of a flanged bush of the present invention that includes an undercut region positioned in either an exterior portion or an interior portion of a substantially cylindrical structure.

Referring to FIG. 2, in one embodiment of the present invention, a flanged bush 20 includes an undercut region 22 positioned in either the exterior portion or the interior portion of the substantially cylindrical structure. Preferably, this undercut region 22 is positioned in the portion having the polymer overlay 14. The undercut region 22 decreases stresses in the polymer overlay 14 and, optionally, the surface of the steel backing 12, and provides a transition zone between the substantially cylindrical structure and the radial flange 16. Functionally, the undercut region 22 provides a second contact surface area 24 that is greater than the first contact surface area 18 (FIG. 1). Advantageously, this increase in contact surface area decreases the surface pressure exerted on the radial flange material when it is contacted with the housing or other structure, thereby increasing the life of the flanged bush 20. In effect, the undercut region 22 creates separate and independent substantially cylindrical structure and radial flange contact surfaces 26 and 28. The undercut region 22 may have a substantially trapezoidal, rectangular, or other cross-sectional shape. For example, the undercut region 22 may have a trapezoidal cross-sectional shape with sides that are about 30 degrees from vertical.

Figure 3:
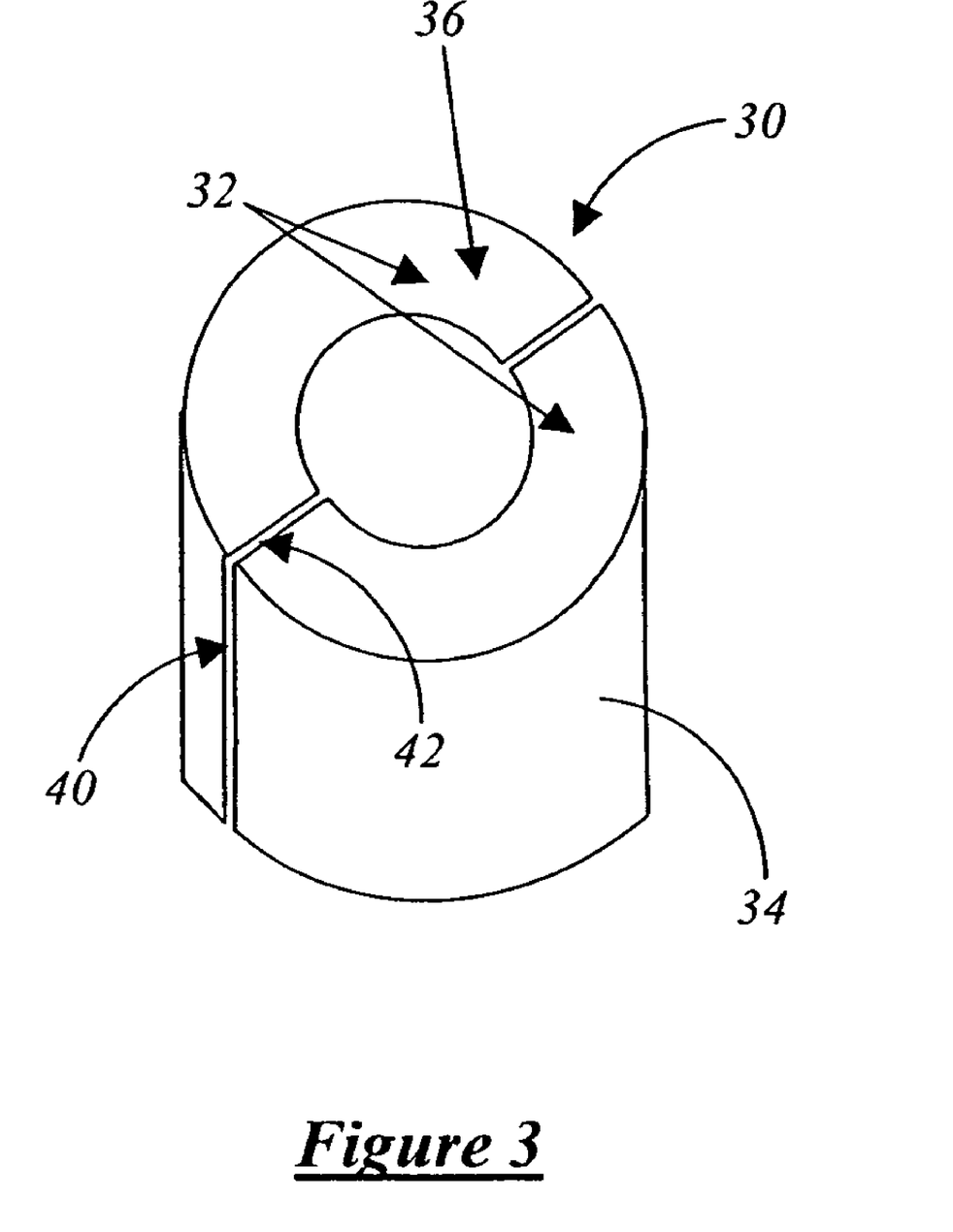
FIG. 3 is a perspective view of another embodiment of a flanged bush of the present invention that includes a plurality of substantially semi-circular members fixedly attached or welded to the substantially cylindrical structure, forming either an out-turned or an in-turned radial flange.

Referring to FIG. 3, in another embodiment of the present invention, a flanged bush 30 includes a plurality of substantially semi-circular members 32 (two (2) substantially semi-circular members 32 are shown). These substantially semi-circular members 32 may be made of steel or another metal and are fixedly attached or welded to the substantially cylindrical structure 34, forming either an out-turned or an in-turned radial flange (an in-turned radial flange 36 is shown).

Figure 4:
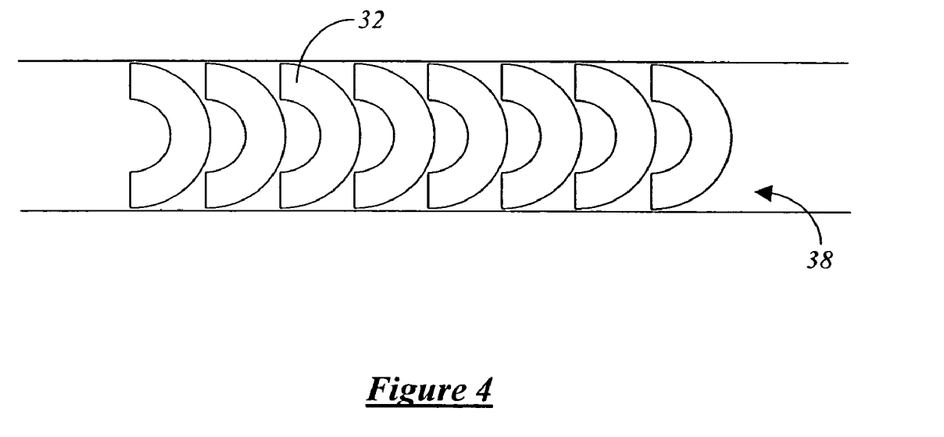
FIG. 4 is a schematic diagram of one embodiment of a method for forming a flanged bush of the present invention that includes stamping a plurality of substantially semicircular members from a sheet of suitable radial flange-forming material.

Referring to FIG. 4, in a further embodiment of the present invention, the plurality of substantially semi-circular members 32 are stamped from a sheet of suitable radial flange-forming material 38, such as steel or another metal. The plurality of substantially semicircular members 32 may be, for example, half-washers. The plurality of substantially semicircular members 32 are fixedly attached to the substantially cylindrical structure 34 via, for example, laser or electron beam welding. As is apparent to those of ordinary skill in the art, the use of the plurality of substantially semicircular members 32, as opposed to a complete annulus, to form the radial flange 36 provides more efficient use of the sheet of suitable radial flange-forming material 38 and results in less waste. Advantageously, there is, in principle, no limit to the dimensions of the radial flange 36 that may be formed via this method.

Referring again to FIG. 3, the substantially cylindrical structure 34 may be a wrapped-split bush that has an axially-aligned split 40. Optionally, the axially-aligned split 40 may coincide with a gap 42 formed between the plurality of substantially semi-circular members 32, facilitating compliance of the wrapped-split bush when being disposed in a housing or other structure.

Figure 5:
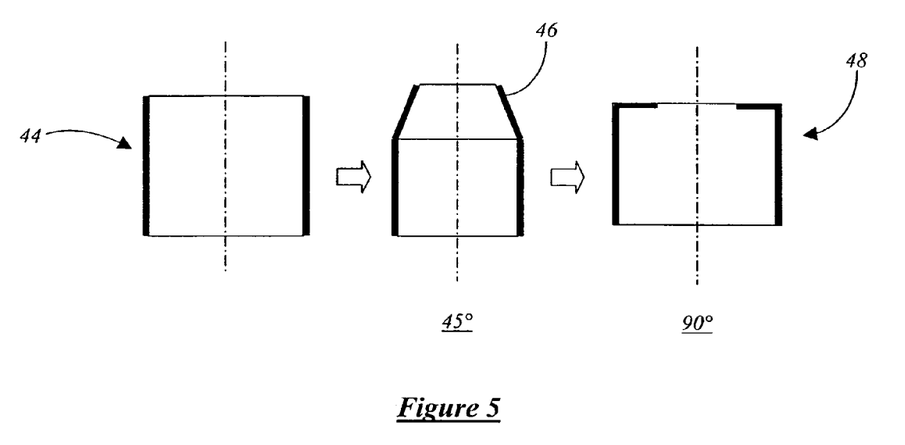
FIG. 5 is a schematic diagram of one embodiment of a two-step process for forming an in-turned radial flange on an in-turned flanged bush of the present invention.

Referring to FIG. 5, in a further embodiment of the present invention, an in-turned flanged bush 48 is formed by bending an end portion of a substantially cylindrical structure 44 inward to form an in-turned radial flange 46. Preferably, this bending process is carried out in a plurality of steps. First, the end portion of the substantially cylindrical structure 44 is bent inward about 45 degrees. Second, the end portion of the substantially cylindrical structure 44 is bent inward about 90 degrees. Advantageously, this bending process requires no welding to form the in-turned radial flange 46.

Figure 6:
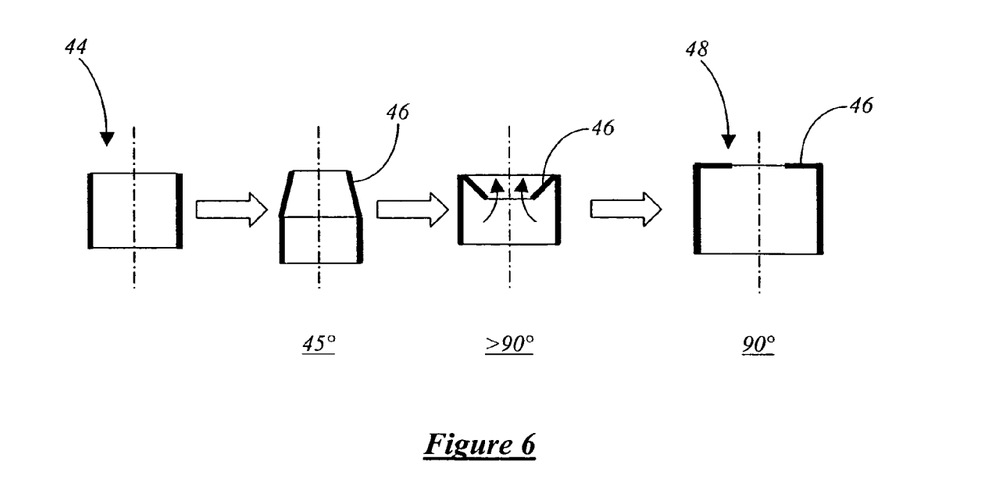
FIG. 6 is a schematic diagram of one embodiment of a three-step process for forming an in-turned radial flange on an in-turned flanged bush of the present invention.

Referring to FIG. 6, in a further embodiment of the present invention, the in-turned flanged bush 48 is also formed by bending the end portion of the substantially cylindrical structure 44 inward to form the in-turned radial flange 46. Again, this bending process is carried out in a plurality of steps. First, the end portion of the substantially cylindrical structure 44 is bent inward about 45 degrees. Second, the end portion of the substantially cylindrical structure 44 is bent inward greater than about 90 degrees. Third, the in-turned radial flange 46 is allowed to return to about 90 degrees upon removal of the bending tool, via the elastic properties of the material of the substantially cylindrical structure 44 and the in-turned radial flange 46. Again, this bending process requires no welding to form the in-turned radial flange 46.

Advantageously, the processes described above are particularly suited to forming an in-turned radial flange on an in-turned flanged bush having a relatively large outer diameter. The greater the outer diameter of the in-turned flanged bush, the easier it is to form the in-turned radial flange without wrinkling. For example, a 1 mm thick in-turned flanged bush with an outer diameter of about 105 mm and a in-turned radial flange diameter of about 90 mm was formed by the processes described above without wrinkling.

Figure 7:
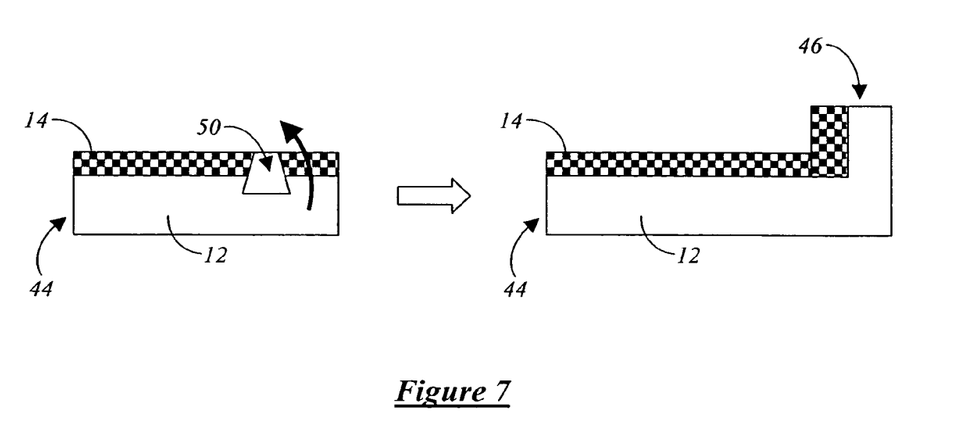
FIG. 7 is cross-sectional side view of one embodiment of an in-turned flanged bush of the present invention that incorporates a groove into an inner radius region of an in-turned radial flange.

Referring to FIG. 7, in a further embodiment of the present invention, a groove 50 may be incorporated into an inner radius region of the in-turned radial flange 46. This is most preferable when an in-turned radial flange 46 is formed on a substantially cylindrical structure 44 that is relatively thick. For example, a groove 50 may be utilized with a substantially cylindrical structure 44 that has a thickness of greater than about 2 mm. Advantageously, the groove 50 removes material from the inner radius region of the in-turned radial flange 46, facilitating bending and decreasing wrinkling.

As described above, the substantially cylindrical structure 44 and the in-turned radial flange 46 may include a steel backing 12 and a polymer overlay 14. The groove 50 may be incorporated into the polymer overlay 14 and, optionally, the steel backing 12. Preferably, the groove 50 has a substantially trapezoidal shape, however, other suitable shapes may be utilized.

Figure 8:
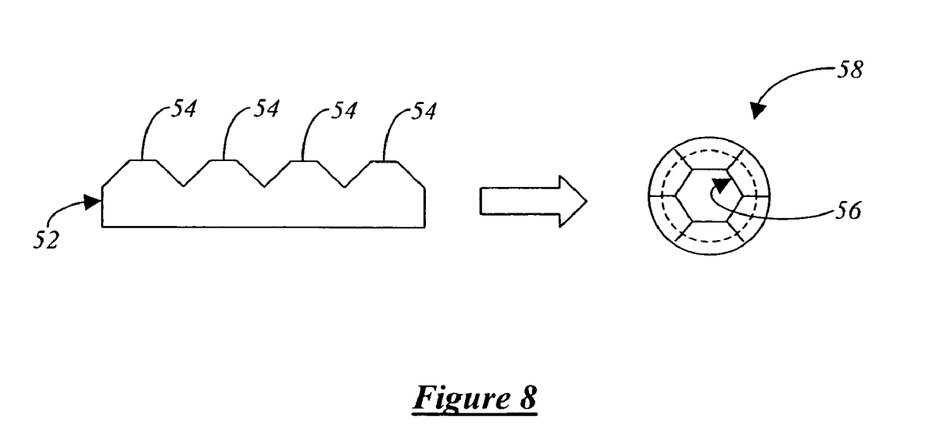
FIG. 8 is a schematic diagram of one embodiment of a process for forming an in-turned flanged bush of the present invention that incorporates a strip of material suitable for forming the in-turned flanged bush having a segmented edge that includes a plurality of segmented portions.

Referring to FIG. 8, in a further embodiment of the present invention, a strip of material suitable for forming an in-turned flanged bush 52 has a segmented edge that includes a plurality of segmented portions 54. The strip of material suitable for forming the in-turned flanged bush 52 is cut into appropriately sized blanks that are rolled or wrapped into an in-turned flanged bush 58 utilizing, for example, a conventional process. The segmented end of the in-turned flanged bush 58 is then formed into an in-turned radial flange 56 utilizing the processes described above. The plurality of segmented portions 54 provide reduced wrinkling of the surface of the in-turned radial flange 56. Optionally, the edges of adjacent segmented portions 54 may be welded using, for example, laser or electron beam welding, providing increased stiffness of the in-turned radial flange 56. The shape, angle, and number of segmented portions may be selected based upon the outer diameter of the in-turned flanged bush 58 and the like.

Figure 9:
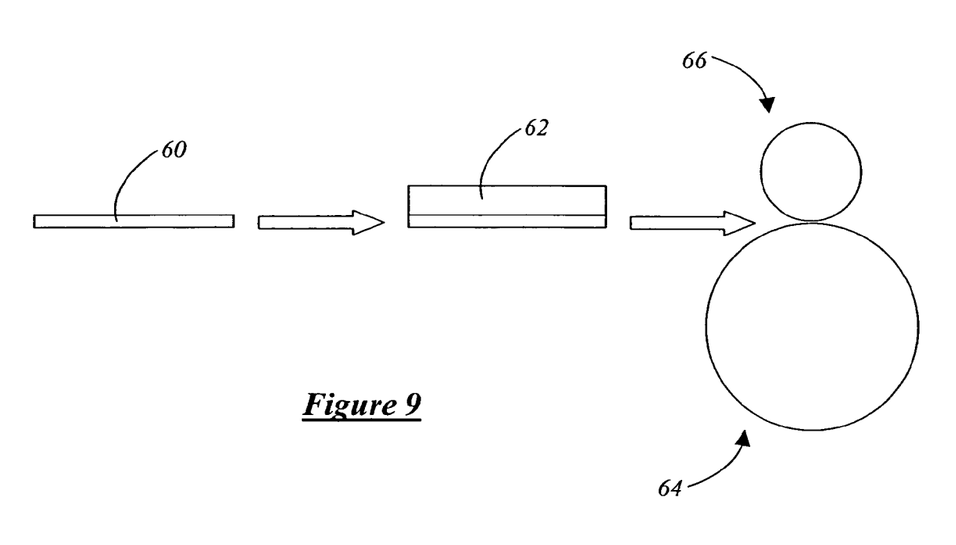
FIG. 9 is a schematic diagram of one embodiment of a process for forming an in-turned flanged bush of the present invention that includes providing a flat strip of bearing material, bending an edge of the strip of bearing material, and rolling the strip of bearing material into a substantially cylindrical flanged bush such that the bent edge forms an in-turned radial flange.

Referring to FIG. 9, in a further embodiment of the present invention, a process for manufacturing an in-turned flanged bush includes providing a flat strip of bearing material 60, bending an edge 62 of the strip of bearing material through about 90 degrees, and rolling the strip of bearing material into a substantially cylindrical flanged bush such that the bent edge 62 forms an in-turned radial flange. Preferably, the strip of bearing material is a blank that has been cropped from a continuous strip or sheet of bearing material. Optionally, the strip of bearing material 60 may be provided with a groove in the region that will form the inner radius of the in-turned radial flange, as described above. Optionally, the strip of bearing material may also be provided with a plurality of cuts along the edge 62, either before or after bending, minimizing wrinkling in the surface of the in-turned radial flange during the flanging process, as described above.

The in-turned radial flange is formed by advancing the strip of bearing material 60 through a pair of oppositely-rotating rollers 64 and 66. One of the rollers 64 may have a larger diameter than the other first 66. Advantageously, this process does not require any welding.

Although the flanged bushes of the present invention, and the methods for the manufacture thereof, have been described and illustrated with reference to preferred embodiments and examples thereof, other embodiments and examples may be used. For example, the flanged bushes formed may be wrapped bushes, rolled bushes, or deep-drawn bushes. Likewise, the flanged bushes may have out-turned or in-turned radial flanges. Additionally, the flanged bushes may have a polymer overlay on the inner or outer diameter surface. The following claims are intended to cover all such equivalents.

What is claimed is:

1. A flanged bush, comprising:
   a substantially cylindrical body portion;
   a radial flange portion integrally formed with the substantially cylindrical body portion, wherein the radial flange portion extends radially-inward from the substantially cylindrical body portion; and
   an undercut region disposed within a surface of the substantially cylindrical body portion and the radial flange portion, wherein the undercut region is operable for relieving stresses present in the surface of the substantially cylindrical body portion and the radial flange portion.

2. The flanged bush of claim 1, wherein the undercut region is disposed within a surface of a transition region between the substantially cylindrical body portion and the radial flange portion.

3. The flanged bush of claim 1, wherein the substantially cylindrical body portion and the radial flange portion comprise a relatively strong backing layer and a bearing overlay/lining layer.

4. A flanged bush, comprising:
   a substantially cylindrical body portion;
   a radial flange portion integrally formed with the substantially cylindrical body portion; and
   an undercut region disposed within a surface of the substantially cylindrical body portion and the radial flange portion, wherein the undercut region is operable for relieving stresses present in the surface of the substantially cylindrical body portion and the radial flange portion, wherein the undercut region comprises a substantially trapezoidal shape.

5. The flanged bush of claim 4, wherein the radial flange portion extends radially-outward from the substantially cylindrical body portion.

6. A method for the manufacture of a flanged bush, comprising:
   providing a substantially cylindrical body portion;
   undercutting a region disposed within a surface of the substantially cylindrical body portion; and
   bending an end portion of the substantially cylindrical body portion to form a radial flange portion, wherein the resulting bend is coincident with the undercut region, thereby relieving stresses present in the surface of the substantially cylindrical body portion and the radial flange portion, wherein bending the end portion of the substantially cylindrical body portion to form a radial flange portion comprises bending the end portion of the substantially cylindrical body portion radially-inward to form an in-turned radial flange portion.

7. The method of claim 6, wherein the undercut region comprises a substantially trapezoidal shape.

8. A flanged bush, comprising:
a substantially cylindrical body portion; and
a pair of substantially semi-circular members fixedly attached to the substantially cylindrical body portion, wherein the pair of substantially semi-circular members form a radial flange portion of the flanged bush, wherein the radial flange portion extends radially-inward from the substantially cylindrical body portion.

9. The flanged bush of claim 8, wherein the substantially cylindrical body portion comprises an axially-aligned split.

10. The flanged bush of claim 9, wherein the axially-aligned split is coincident with a gap formed between the pair of substantially semi-circular members, facilitating compliance of the flanged bush when disposed in a housing.

11. The flanged bush of claim 8, wherein the substantially cylindrical body portion and the radial flange portion comprise a relatively strong backing layer and a bearing overlay/lining layer.

12. A method for the manufacture of a flanged bush, comprising:
providing a substantially cylindrical body portion;
providing a plurality of substantially semi-circular members; and
fixedly attaching the plurality of substantially semi-circular members to the substantially cylindrical body portion, wherein the plurality of substantially semi-circular members form a radial flange portion of the flanged bush, wherein the radial flange portion extends radially-inward from the substantially cylindrical body portion.

13. The method of claim 12, wherein the substantially cylindrical body portion comprises an axially-aligned split.

14. The method of claim 13, further comprising making the axially-aligned split coincident with a gap formed between the plurality of substantially semi-circular members, facilitating compliance of the flanged bush when disposed in a housing.

15. The method of claim 12, wherein fixedly attaching the plurality of substantially semi-circular members to the substantially cylindrical body portion comprises welding the plurality of substantially semi-circular members to the substantially cylindrical body portion.

16. A method for the manufacture of a flanged bush, comprising:
providing a substantially cylindrical structure, wherein the substantially cylindrical structure comprises an end portion;
bending the end portion of the substantially cylindrical structure about 45 degrees; and
bending the end portion of the substantially cylindrical structure about 90 degrees, wherein the bent end portion of the substantially cylindrical structure forms a radial flange portion of the flanged bush.

17. The method of claim 16, further comprising bending the end portion of the substantially cylindrical structure past about 90 degrees and allowing the end portion of the substantially cylindrical structure to return to about 90 degrees, wherein the bent end portion of the substantially cylindrical structure forms a radial flange portion of the flanged bush.

18. The method of claim 16, wherein the radial flange portion extends radially-outward from the substantially cylindrical structure.

19. The method of claim 16, wherein the radial flange portion extends radially-inward from the substantially cylindrical structure.

20. The method of claim 16, further comprising incorporating a groove into a surface of the substantially cylindrical structure, the groove coincident with a bending region of the end portion of the substantially cylindrical structure.

21. The method of claim 20, wherein the groove comprises a substantially trapezoidal shape.

22. The method of claim 16, further comprising cutting a plurality of segmented portions into the end portion of the substantially cylindrical structure.

23. The method of claim 22, further comprising welding edges of adjacent segmented portions.

24. A method for the manufacture of a flanged bush, comprising:
providing a flat strip of bearing material;
bending an edge of the flat strip of bearing material about 90 degrees; and
rolling the flat strip of bearing material into a substantially cylindrical structure such that the bent edge forms a radial flange portion, wherein the radial flange portion extends radially-inward from the substantially cylindrical structure.

25. The method of claim 24, further comprising incorporating a groove into a surface of the flat strip of bearing material, the groove coincident with a bending region of the edge of the flat strip of bearing material.

26. The method of claim 25, wherein the groove comprises a substantially trapezoidal shape.

27. The method of claim 24, further comprising cutting a plurality of segmented portions into the edge of the flat strip of bearing material.

28. The method of claim 27, further comprising welding edges of adjacent segmented portions.

* * * * *